United States Patent

[11] 3,583,494

| [72] | Inventors | Howard G. Thompson<br>Livonia;<br>Ole J. Thorsrud, Dearborn Heights, both of, Mich. |
|---|---|---|
| [21] | Appl. No. | 7,375 |
| [22] | Filed | Feb. 2, 1970 |
| [45] | Patented | June 8, 1971 |
| [73] | Assignee | Massey-Ferguson Inc.<br>Detroit, Mich.<br>Continuation of application Ser. No. 664,684, Aug. 31, 1967, now abandoned. |

[54] WEIGHT TRANSFER HITCH FOR PLOWS
5 Claims, 6 Drawing Figs.

[52] U.S. Cl.................................................. 172/285,
172/439, 280/406
[51] Int. Cl........................................................ A01b 69/08
[50] Field of Search.......................................... 172/7, 9,
11, 12, 285, 291, 239, 443, 444, 463; 280/405 B,
406, 407, 460.1, 461.1, 414.5

[56] References Cited
UNITED STATES PATENTS

| 2,322,342 | 6/1943 | Bunn............................ | 172/680 |
| 2,642,293 | 6/1953 | Simmons....................... | 280/420 |
| 3,061,020 | 10/1962 | Mannheim .................... | 172/285 |
| 3,212,588 | 10/1965 | Schmidt ........................ | 172/339 |
| 3,233,682 | 2/1966 | Thompson.................... | 172/7 |
| 3,412,811 | 11/1968 | Thompson.................... | 172/7 |

Primary Examiner—Robert E. Bagwill
Assistant Examiner—Alan E. Kopecki
Attorney—Gerhardt, Greenlee and Farris

ABSTRACT: Apparatus for connecting semimounted and pull-type plows to tractors that permit steering of the trailing end of the plow as well as pivotal movement of the plow relative to the tractor about both horizontal and vertical axes. A hydraulic cylinder exerts a force on the implement tending to lift the trailing end of the implement and thereby increase the traction on the tractor rear wheels.

PATENTED JUN 8 1971

INVENTORS.
HOWARD G. THOMPSON
BY OLE J. THORSRUD

Tweedale & Gerhardt
ATTORNEYS.

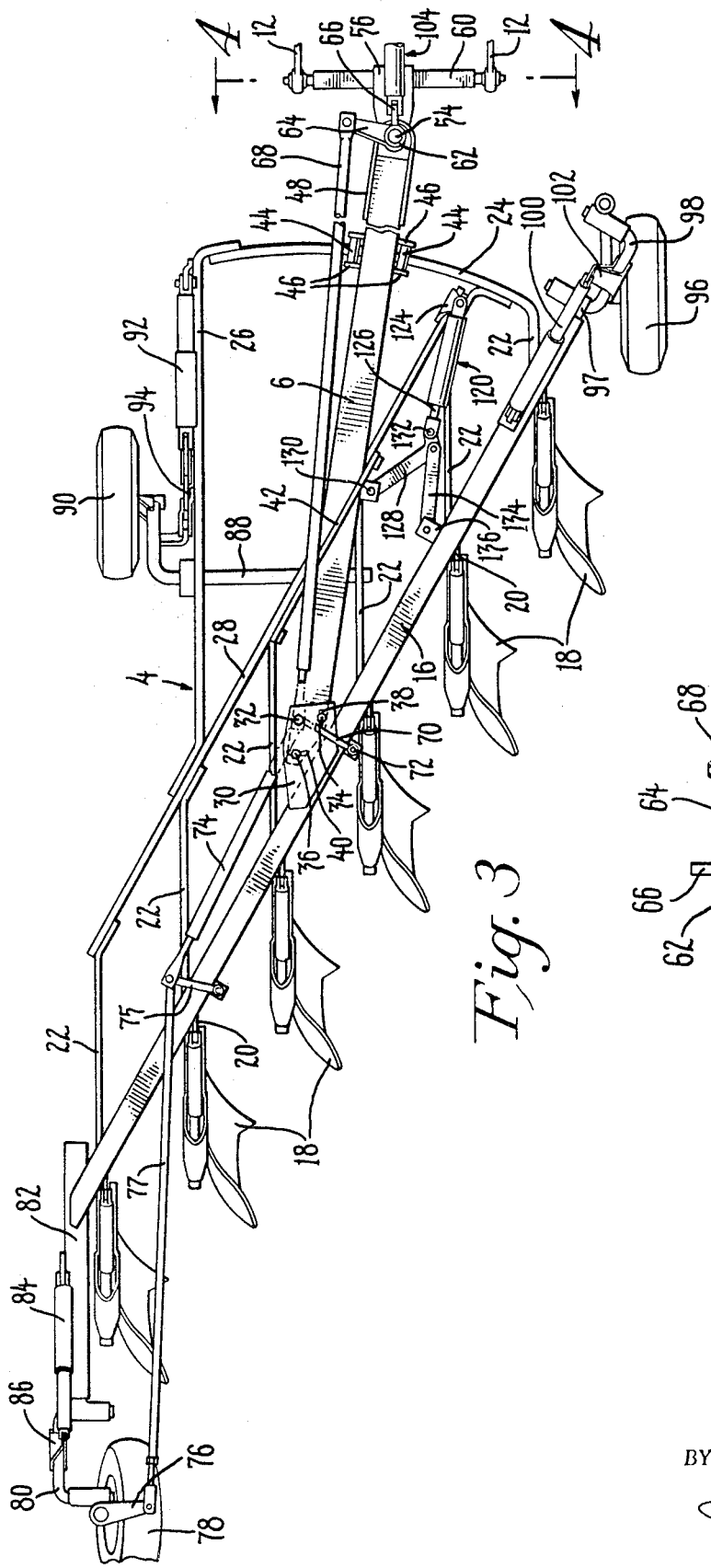
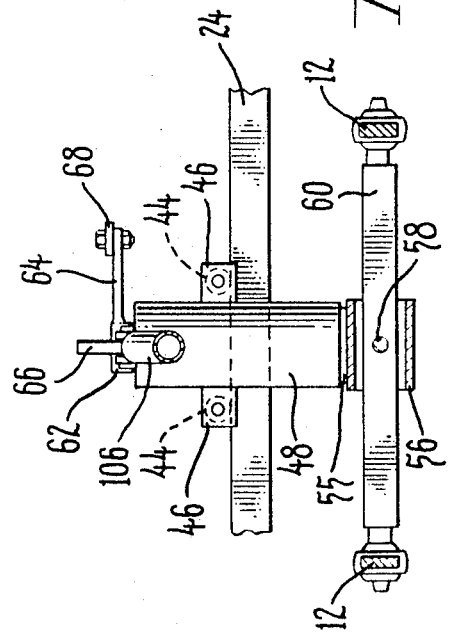
Fig. 3
Fig. 4
INVENTORS.
HOWARD G. THOMPSON
BY OLE J. THORSRUD
Tweedale & Gerhardt
ATTORNEYS.

INVENTORS.
HOWARD G. THOMPSON
BY  OLE J. THORSRUD
Tweedale & Gerhardt
ATTORNEYS.

WEIGHT TRANSFER HITCH FOR PLOWS

This application is a continuation of application Ser. No. 664,684, filed on Aug. 31, 1967, now abandoned.

BACKGROUND OF THE INVENTION

1. Field of the Invention

The invention relates generally to hitch apparatus for connecting an implement to a tractor by means of which a portion of the weight of the implement can be transferred to the rear wheels of the tractor to improve traction.

2. Description of the Prior Art

U.S. Pat. No. 3,233,682 to H. G. Thompson, dated Feb. 8, 1966, discloses apparatus for connecting multiple bottom plows to tractors whereby a constant portion of the weight of the plow can be transferred to the tractor rear wheels while at the same time accommodating pitching movement between the tractor, drawbar and plow about their respective pivotal connections.

SUMMARY OF THE INVENTION

In accordance with the present invention, a semimounted or pull-type plow can be connected either with a drawbar pivotally connected to a tractor or with the conventional three-point hitch links of the tractor in such a manner that the plow can swing from side to side during turns relative to the tractor, and a constant proportion of the implement weight from the trailing end of the implement can be transferred to the tractor rear wheels. Moreover, the implement may be provided with a steerable rear wheel which is automatically steered in accordance with changes in the direction of the tractor without interrupting the weight transfer characteristics of the hitch apparatus.

BRIEF DESCRIPTION OF THE DRAWINGS

FIG. 3 is a plan view of the plow of FIG. 1;

FIG. 4 is a view taken along lines 4-4 of FIG. 3;

DESCRIPTION OF THE PREFERRED EMBODIMENTS

Figure 1:
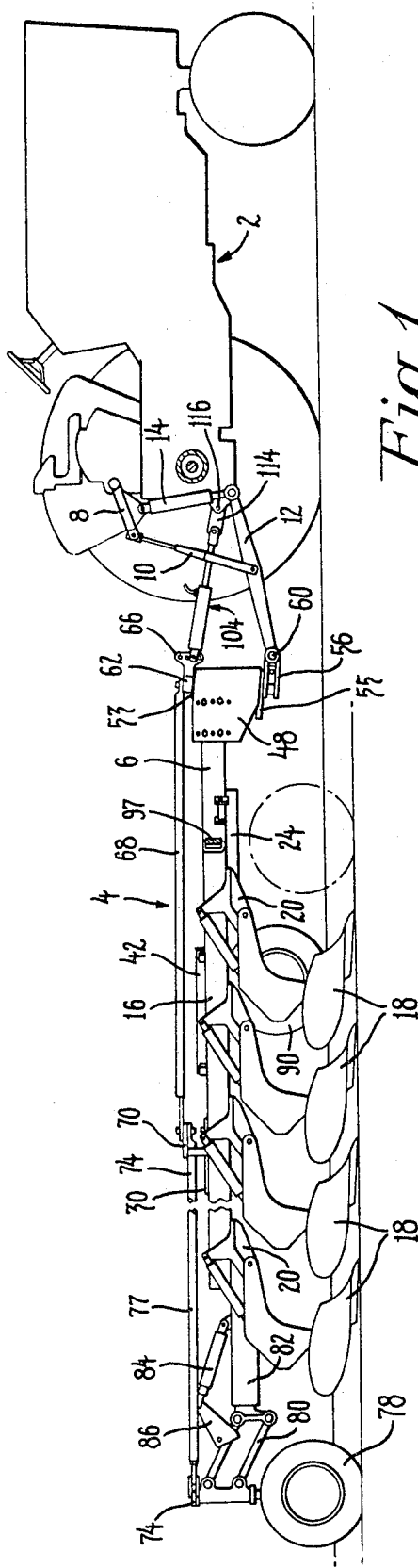
FIG. 1 is an elevational view of a tractor and multiple bottom plow with certain parts omitted for clarity.

In FIG. 1, the tractor and plow are respectively designated collectively by reference numerals 2 and 4. Projecting forwardly from the plow is a tongue 6 which is secured to the three-point hitch of the tractor. The tractor hitch includes lift links 8, drop links 10 and lower draft links 12 pivotally secured to the chassis of the tractor. A hydraulic ram 14 is connected between the tractor and lift links 8 for raising and lowering draft links 12 about their pivotal connection with the tractor through lift links 8 and drop links 10 in a conventional manner.

The plow frame includes a main beam 16 which extends obliquely to the direction of travel and which provides the primary support for a plurality of plow bottoms 18. The standards of the plow bottoms are secured to brackets 20 mounted along the length of beam 16 and secured to longitudinal or fore and aft extending frame members 22. The right-hand longitudinal frame member 23 (as viewed from the rear) extends from a front, arcuate frame member 24, the other end of which is secured to a longitudinal or fore and aft extending side frame member 26. All of the longitudinal frame members 22 are secured to a diagonal or oblique frame member 28 extending parallel to beam 16.

The implement tongue 6 is pivotally mounted by a pin 32 to a plate 30 welded or otherwise secured to beam 16. To provide resistance to torsional stresses on tongue 6, the tongue is further connected with plate 30 by means of bolts or pins 34 and 6 projecting through arcuate slots 38 and 40, respectively, to accommodate the pivotal movement of tongue 6 about pin 32. A frame member 42 overlies tongue 6 and has depending end portions secured to the diagonal frame member 28 to define a slot receiving tongue 6. The forward end of tongue 6 is supported on the arcuate frame member 24 by means of rollers 44 mounted between bracket arms 46 as shown more clearly in FIGS. 3 and 4.

Figure 2:
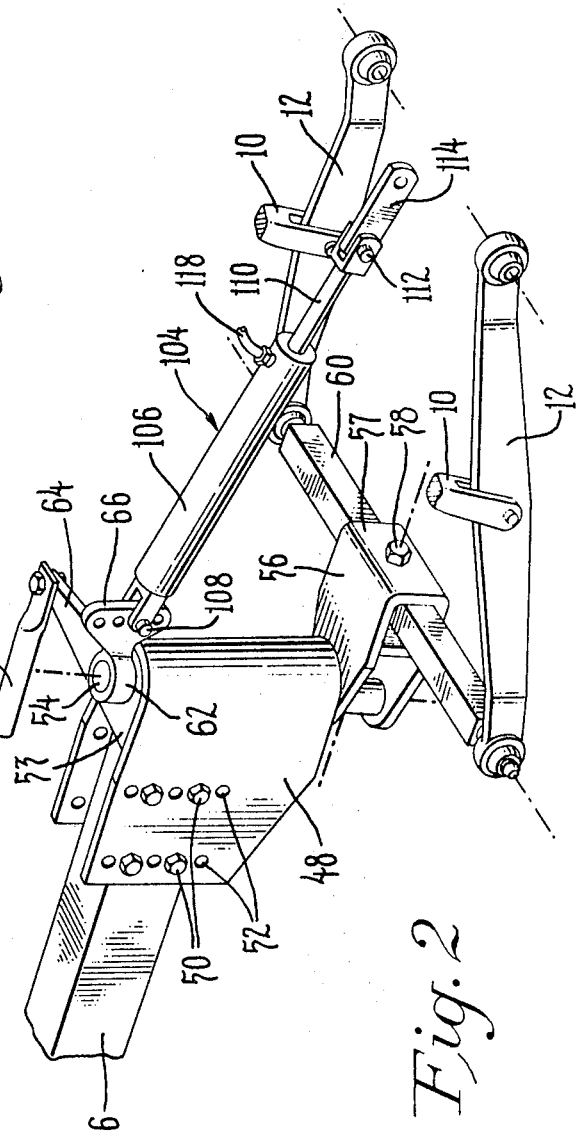
FIG. 2 is an enlarged perspective view of the hitch apparatus of FIG. 1.

Mounted on the forward end of tongue 6 is a U-shaped hitch member or connector 48 which is secured to tongue 6 by bolts 50 passing through a series of holes 52 which permit the U-shaped hitch member to be adjusted vertically relative to the tongue. As shown in FIGS. 2 and 4, plates 53 and 55 are mounted on the upper and lower ends of the connector 48 for supporting bearings for a spindle 54. Spindle 54 is rotatable within the U-shaped hitch member 48. Nonrotatably mounted on the lower end of spindle 54 is a bracket 56 having a transverse sleeve portion 57 which receives a crossbar 60 rotatably mounted between the trailing ends of the lower links 12. Crossbar 60 is pivotally secured to bracket 56 by a bolt 58.

Nonrotatably mounted on the upper end of spindle 54 is a fitting 62 formed with a steering arm 64 projecting laterally from the axis of spindle 54, and a lug 66 formed with a series of holes. One end of a steering rod 68 is pivotally secured to the outer end of steering arm 64. Steering rod 68 has its other end pivotally connected to a lever 70 (FIG. 3). Lever 70 is pivoted at 72 to beam 16, rod 3 is made up of telescopically adjustable rods and is mounted between lever 70 and a lever 75. Rod 77 extends from lever 75 to steering arm 76 for the rear furrow wheel 78 of the plow. The rear furrow wheel 78 is mounted in a conventional manner on parallel links 80 secured to the end of a longitudinal support beam 82. Furrow wheel 78 is raised and lowered relative to beams 82 and 16 by means of a hydraulic ram 84 connected between beam 82 and an arm 86 mounted on the upper parallel link 80. Steering rod 68 may be telescopically adjusted in length between steering arm 64 and lever 70.

A rockshaft 88 (FIG. 3) is rotatably mounted on the plow frame and carries a land wheel 90 which is raised and lowered relative to the plow frame by means of a hydraulic ram 92 interconnected between the rockshaft and cylinder by means of a conventional linkage 94, the construction of which constitutes no part of the present invention.

Mounted on the forward end of beam 16 by a bracket 97 is a front furrow wheel 96. Wheel 96 is supported in bracket 97 by means of parallel links 98 and is raised and lowered relative to beam 16 by means of a hydraulic ram 100 connected between beam 16 and an arm 102 on the upper parallel link 98. Wheel 96, in the illustrated embodiment, is of the castering type but could obviously be interconnected with spindle 54 so as to be automatically steered.

It is well known in the art to transfer weight from a trailed vehicle implement to the rear wheels of the tractor by applying a constant lifting force to the front end of the implement through the tractor links. However, with an earthworking implement of the type illustrated in FIG. 1, such a constant force at the forward end of the implement would unbalance the vertical forces between the forward and rear plow bottoms that is to say, the lifting force would tend to lift the forward plow bottoms out of the ground while having little or no effect on the rear plow bottoms. Thus, as pointed out in the previously referred to Thompson U.S. Pat. N0. 3,233,682, the entire disclosure of which is incorporated herein by reference, a force must be applied in a direction tending to rotate the implement upwardly and forwardly about its connection with the tractor in order to apply lifting force to the trailing end of the plow. This lifting force is applied in the present instance by means of a hydraulic ram 104 (FIG. 2) having a cylinder 106 pivotally connected by a pin 108 with bracket 66, and its piston 110 pivotally connected at 112 with a link 114 secured to the tractor by a pin 116 (FIG.1). The hydraulic ram 104 is connected through hoses 118 with the pressure control system of the tractor so that a constant tension force is applied at bracket 66 which tends to rotate the entire implement 4 about the axis of cross shaft 60, the reaction force being applied to the tractor rear wheels to increase the traction. This lifting force applied by ram 104 remains constant during turns or during movement over undulating ground. Since bracket 56 is nonrotatably mounted on the lower end of spindle 54, turning movement of the tractor relative to the plow causes steering arm 64 to rotate about the axis of spindle 54 and steer the rear wheel 78.

The pivotal connection of tongue 6 with the plow frame permits the position of the plow relative to the tractor to be adjusted thereby permitting the tractor to be driven either in the furrow or on unplowed ground. For adjusting the position of tongue 6 about the axis of pin 32, a hydraulic ram 120 having a cylinder pivotally connected to a bracket 124 and its piston 126 pivotally connected to lever 128. Lever 128 is pivotally connected at 130 with tongue 6 and at 132 with a link 134 the other end of which is pivotally connected to a bracket 136 mounted on beam 16. As is apparent in FIG. 3, extension of ram 120 causes tongue 6 to pivot in a counterclockwise direction about pin 32 to shift the plow toward the right as viewed from the rear relative to the tractor longitudinal axis.

Figure 5:
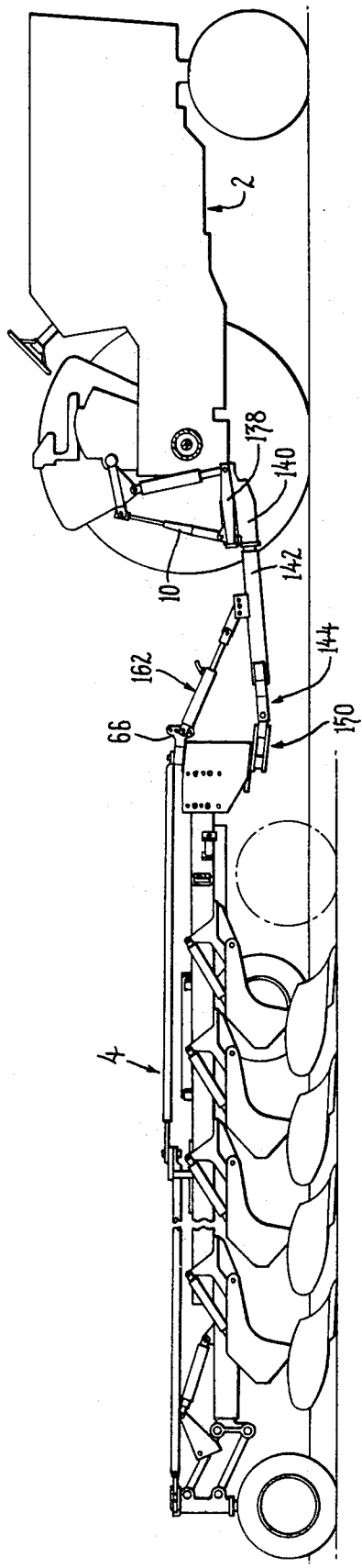
FIG. 5 is a view similar to FIG. 1 illustrating a modification in which the plow is connected with a tractor drawbar.
Figure 6:
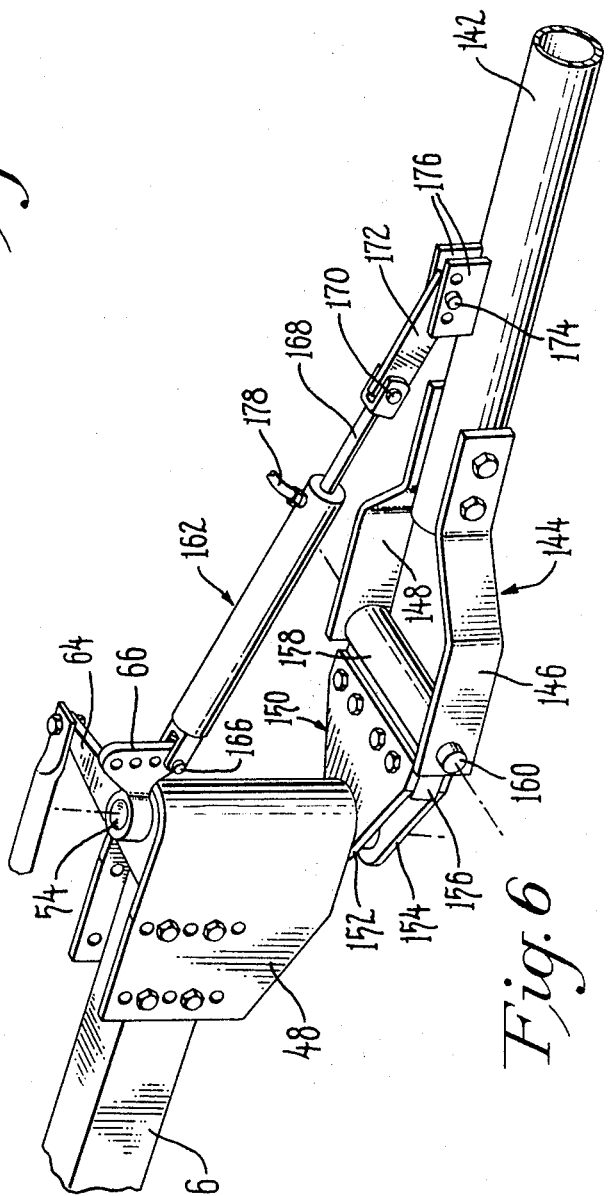
FIG. 6 is an enlarged perspective view of the hitch apparatus of FIG. 5.

FIGS. 5 and 6 illustrate an alternative embodiment of the invention wherein the plow 4 is connected with a drawbar which may be of the general type disclosed in Bunting U.S. Pat. No. 3,241,862, dated Mar. 22, 1966. With reference to FIG. 5, drop links 10 are connected with a frame or yoke member 138 to which is connected a drawbar 140. A drawbar extension 142 is mounted on the drawbar 140, and a yoke member is mounted on the trailing end of extension 142. Yoke member 144 is formed by laterally spaced arms 146 and 148.

Secured to the lower end of the spindle 54 of the implement tongue is a bracket 150 having upper and lower plates 152 and 154, respectively, between which are received the flange 156 of a sleeve member 158. Received in sleeve member 158 is a pin 160 which pivotally connects yoke member 144 with connector 150.

A tension force tending to rotate the plow frame about the axis of pin 60 is applied by means of a hydraulic ram 162 having a cylinder portion pivotally connected at 166 with lug 66, and a piston 168 pivotally connected at 170 with one end of a link 172, the other end of which is pivotally connected at 174 with brackets 176 on the drawbar extension 142. A constant pressure is applied to the ram through hoses 178, as in the previous embodiment, to provide a constant transfer of force from the implement onto the drawbar, which force is reacted by the tractor rear wheels to increase traction. All turning movements of the tractor relative to the implement are accompanied by the rotation of spindle 54 within the U-shaped member 48 which in turn causes a steering correction to be transmitted to the rear furrow wheel by means of the steering arm 64.

While specific examples of the invention have been illustrated and described, it should be understood that other forms are possible without departing from the scope and spirit of the invention.

We claim:

1. In a tractor-implement combination in which the tractor has a hydraulically controlled hitch linkage including a pair of draft links with a pressure control system for maintaining a constant lifting force on the hitch linkage while at the same time permitting movement of the hitch linkage relative to the tractor and in which the implement has a frame with a plurality of earth working tools mounted thereon; at least one wheel to support the rear portion of the frame; at least one wheel mounted on the forward portion of the implement frame; coupling means connecting the implement frame with the tractor hitch linkage including a hitch member on the implement, a spindle mounted on said hitch member for rotation relative to said hitch member about an upright axis, a rigid member attached to the lower end of said spindle and rotatably connected to the tractor draft links for pivotal movement about a horizontal transverse axis to permit vertical movement of the implement relative to the tractor hitch linkage about the horizontal transverse axis and side to side swinging movement of the implement relative to the tractor about the upright axis, and a hydraulic ram in communication with the pressure control system of the tractor having one end pivotally connected to the spindle at a point above the horizontal transverse axis and the other end pivotally connected to the chassis of the tractor for exerting upon being contracted, a force on the implement tending to rotate the implement about said horizontal transverse axis and thereby transfer weight from the rear of the implement to the tractor draft links as determined by the pressure in the pressure control system.

2. The combination claimed in claim 1 wherein the wheel to support the rear portion of the frame is steerable and further including means connected to the implement to steer the rear wheel.

3. The combination claimed in claim 2 wherein the linkage means for steering the rear wheel includes a steering arm fixed to said spindle and motion transmitting means connecting the steering arm with said steerable rear wheel for steering said rear wheel in accordance with the angular position of the implement relative to the tractor about said upright axis.

4. The combination claimed in claim 1 wherein a lug member is mounted on the upper end of said spindle and wherein one end of the hydraulic ram, for exerting a force on the implement which tends to lift the rear of the implement, is connected to said lug.

5. The combination claimed in claim 1 wherein the rigid member, attached to the lower end of the spindle, is attached to the spindle by a sleeve member on the lower end of the spindle.